US012139070B2

United States Patent
Coudre et al.

(10) Patent No.: US 12,139,070 B2
(45) Date of Patent: Nov. 12, 2024

(54) ATTENTION ASSIST FOR DYNAMIC BLIND ZONE WITH DRIVER STATE IN THE LOOP

(71) Applicant: Aptiv Technologies AG, Schaffhausen (CH)

(72) Inventors: Jerome Coudre, Bailly-Romainvilliers (FR); Jerome Vermersch, Saint Mard (FR); Azziz Maroc, Paris (FR)

(73) Assignee: Aptiv Technologies AG, Schaffhausen (CH)

( * ) Notice: Subject to any disclaimer, the term of this patent is extended or adjusted under 35 U.S.C. 154(b) by 100 days.

(21) Appl. No.: 17/455,663

(22) Filed: Nov. 18, 2021

(65) Prior Publication Data

US 2022/0169176 A1 Jun. 2, 2022

(30) Foreign Application Priority Data

Nov. 30, 2020 (EP) ..................................... 20210810

(51) Int. Cl.
  *B60Q 9/00* (2006.01)
  *B60K 35/00* (2006.01)
  (Continued)

(52) U.S. Cl.
  CPC .............. *B60Q 9/008* (2013.01); *B60K 35/00* (2013.01); *G08B 7/06* (2013.01); *B60K 35/28* (2024.01);
  (Continued)

(58) Field of Classification Search
  CPC .......... G08B 7/06; B60Q 9/008; B60K 35/00; B60K 2370/178; B60K 2370/149;
  (Continued)

(56) References Cited

U.S. PATENT DOCUMENTS

| 8,886,023 B2 | 11/2014 | Satoh |
| 10,604,073 B2 | 3/2020 | Cho |

(Continued)

FOREIGN PATENT DOCUMENTS

| CN | 108437898 | 4/2019 |
| EP | 2168815 | 3/2010 |

(Continued)

OTHER PUBLICATIONS

"Extended European Search Report", EP Application No. 20210810.6, Jun. 7, 2021, 10 pages.

(Continued)

*Primary Examiner* — Brian Wilson
(74) *Attorney, Agent, or Firm* — Harness, Dickey & Pierce, P.L.C.

(57) ABSTRACT

Disclosed is a method defining a driver-assistance procedure implemented by a driver-assistance system of a vehicle, the procedure including performing an environment analysis around the vehicle, identifying a potential risk around the vehicle based on the performed environment analysis, identifying a field of view of a driver, determining whether or not the identified potential risk is located in the field of view of the driver and is hidden in a blind spot area of the vehicle, when the identified potential risk is located in the field of view of the driver and the identified potential risk is hidden in the blind spot area of the vehicle, informing the driver to change a driver's position in order to be able to see the identified potential risk.

18 Claims, 3 Drawing Sheets

(51) Int. Cl.
*G08B 7/06* (2006.01)
*B60K 35/28* (2024.01)
*B60W 50/14* (2020.01)

(52) U.S. Cl.
CPC ........ *B60K 2360/178* (2024.01); *B60W 50/14* (2013.01)

(58) Field of Classification Search
CPC ........ B60K 2370/152; B60K 2370/157; B60K 2370/176; B60K 2370/179; B60K 2370/188; B60K 2370/193; B60K 2370/21; B60K 2370/48; B60K 35/28; B60K 2360/178; B60K 35/22; B60K 35/29; B60K 2360/149; B60K 2360/176; B60K 2360/179; B60K 2360/188; B60K 2360/21; B60K 2360/48; B60K 35/10; B60K 35/26; B60W 50/14; B60W 2040/0818; B60W 10/18; B60W 10/20; B60W 30/09; B60W 60/0015; B60W 60/0051; B60W 60/0059; B60W 2050/143; B60W 2050/146; B60W 2540/223; B60W 2540/225; B60W 2554/80; B60W 40/08; B60W 30/0956; B60W 50/0098; B60W 2552/50

See application file for complete search history.

(56) References Cited

U.S. PATENT DOCUMENTS

| | | | | |
|---|---|---|---|---|
| 2012/0101701 A1* | 4/2012 | Moshchuk | ............ | B60W 30/09 701/70 |
| 2016/0009175 A1* | 1/2016 | McNew | ............. | G01C 21/3652 340/438 |
| 2016/0332569 A1* | 11/2016 | Ishida | ..................... | B60Q 9/008 |
| 2017/0247031 A1* | 8/2017 | Feit | ........................ | G01S 13/931 |

FOREIGN PATENT DOCUMENTS

| | | |
|---|---|---|
| EP | 3657467 | 5/2020 |
| JP | 2009251761 | 10/2009 |
| JP | 4946682 | 6/2012 |
| KR | 20150044346 | 4/2015 |
| KR | 101647730 | 8/2016 |
| KR | 101992641 | 6/2019 |
| WO | 2016209425 | 12/2016 |

OTHER PUBLICATIONS

Lerner, et al., "Human Factors for Connected Vehicles: Effective Warning Interface Research Findings", (Report No. DOT HS 812 068). Washington, DC: National Highway Traffic Safety Administration, Sep. 2014, 134 pages.

\* cited by examiner

ATTENTION ASSIST FOR DYNAMIC BLIND ZONE WITH DRIVER STATE IN THE LOOP

CROSS-REFERENCE TO RELATED APPLICATION

This application claims priority to European Patent Application Number 20210810.6, filed Nov. 30, 2020, the disclosure of which is hereby incorporated by reference in its entirety herein.

BACKGROUND

Nowadays, the usage of motorized vehicles is in constant expansion. In urban areas, more and more road users are mixing together on the roads (e.g., vehicles such as cars, trucks or pedestrians and other users). The increase in the number of road users leads to an increase in the risk of accidents between them. Drivers needs to be increasingly attentive, and vehicles equipped with Advanced Driver-Assistance Systems (ADAS) can help limit and anticipate hazardous or dangerous situations.

One of the risks in the event of an hazardous situation is the fact that the driver is not aware of upcoming or forthcoming action on the vehicle by driver-assistance systems (e.g., braking, steering, horning) to avoid the danger. This can lead to unexpected reaction of the driver, since he is still responsible of the vehicle's movement, over the driver-assistance systems.

This risk is amplified by the fact that there are blind spot areas (or zones) due to the conventional construction of the vehicle. In addition to the two known blind spot areas at the rear of the vehicle (car), there are two others blind spot areas for the driver in his line of sight or field of view. These are due to the two front car pillars. Since the two front pillar blind areas mainly depend on where the driver look is pointing (or driver's gaze or field of view is directed), we can define them as dynamic blind areas. As soon as a road user is inside one of the blind spot areas, the driver cannot see him as it is not inside his field of view. As a result, the driver is not informed of his presence, which increase the risk of an accident.

With the evolution of driver-assistance systems, the risks of accident are reduced but still existing. These systems are composed of radars, cameras or lidars (frontal and lateral) which allow for a 360 degree identification of road users. However, driver-assistance systems require an attention of the driver in certain specific scenarios.

The present disclosure improves the situation over the prior art. In particular, a purpose of the present disclosure is to give to the driver the sense of responsibility, and to help him during driving, while giving the relevant level of information without transferring the whole responsibility to the driver-assistance system.

SUMMARY

The present disclosure relates to the field of safe driving of vehicles. Disclosed methods and systems can be used for example in a vehicle, such as a car. In aspects, described is a method for driver assistance to be implemented in a driver-assistance system of a vehicle, including the following steps (operations): performing an environment analysis around the vehicle, identifying a potential risk around the vehicle based on the performed environment analysis, identifying a field of view of a driver, and determining, dynamically when the vehicle circulates, whether or not the identified potential risk is located in the field of view of the driver and is hidden in a blind spot area of the vehicle, and when the identified potential risk is located in the field of view of the driver and the identified potential risk is hidden in the blind spot area of the vehicle, informing the driver to change a driver's position in order to be able to see the identified potential risk. This informs the driver that it is his responsibility to change its position in order to acknowledge himself the danger. The change in his position could be either changing the head position, changing his field of view, moving his body, or the like. The improvement of the safety may be done with the increase of the responsibility of the driver, without always giving him alerts or unnecessary information, and without giving him the impression that the driver-assistance system is driving alone, without driver supervision. This anticipates the risks (or targets) and dangers, and increases the acceptability of information by the driver.

The steps of performing the environment analysis around the vehicle, identifying the potential risk or target around the vehicle based on the performed environment analysis, and identifying the field of view of the driver, that is to say based on the data retrieved by the sensors, are well known by the one skilled in the art and are conventional. Non-limitative examples of potential risk or targets are pedestrian, cyclist, vehicle, animals, trucks, train and the like.

Advantageously, the method further includes the following steps: determining whether or not the driver has changed the driver's position in order to be able to see the identified potential risk, and when the driver has changed the driver's position in order to be able to see the identified potential risk, repeating the steps. The steps may be repeated, as necessary. to allow a continuous safe driving. It is to be noted, that all the steps of the present disclosure may be repeated, provided it is not in contradiction with other steps.

Advantageously, the method further includes the following steps: when the driver has not changed the driver's position in order to be able to see the identified potential risk, informing the driver to immediately change the driver's position in order to be able to see the identified potential risk. This further increases the information level of the driver, so that he still considers himself as responsible of the driving. This shows him that the driving remains its responsibility.

Advantageously, the method further includes the following steps: determining whether or not a critical point of the identified potential risk will be reached within a double check period, when the critical point of the identified potential risk will be reached within the double check period, informing the driver of a forthcoming takeover of the driver-assistance system and then allowing the forthcoming takeover of the driver-assistance system. This informs the driver of the forthcoming action of the driver-assistance system, such as braking, steering, changing direction, drifting, horning, blinking or any other driver-assistance action.

Advantageously, the method further includes the following steps: determining whether or not a critical point of the identified potential risk will be reached within a general safety period, when the critical point of the identified potential risk will be reached within a general safety period, informing the driver of a forthcoming takeover of the driver-assistance system, and then allowing the forthcoming takeover of the driver-assistance system. This may permit for a general safety period to take over the control of the vehicle in all cases, so that the safety is improved without further checking, and may permit for the minimal general safety level to be reached.

Advantageously, the method further includes the following step: when the identified potential risk is not located in the field of view of the driver and the identified potential risk is not masked by the blind spot of the vehicle, informing the driver that the identified potential risk is without immediate danger. This gives background information about danger to the driver.

Advantageously, the step: informing the driver to change the driver's position in order to be able to see the identified potential risk, is performed by an orange continuous warning in a human machine interface of the vehicle.

Advantageously, the step: informing the driver to immediately change the driver's position in order to be able to see the identified potential risk, is performed by an orange blinking warning and/or a repeated sound in a human machine interface of the vehicle.

Advantageously, the step: informing the driver of a forthcoming takeover of the driver-assistance system is performed by red continuous warning and/or a continuous alert sound in a human interface of the vehicle.

Advantageously, the human machine interface of the vehicle is a display unit for visual information, including a sound emitting device for acoustic information, in order to inform the driver. In particular, the display unit can emit or generate texts, color, pictogram, light, and any combination thereof. This informs the driver with the relevant level of information, while increasing its responsibility, not giving over information disturbing him, not giving him the impression that the driver-assistance system will do the driving instead of the driver. In particular, reference is made to "Human Factors for Connected Vehicles: Effective Warning Interface Research Findings" published in September 2014 by the National Highway Traffic Safety Administration in the USA, Report No. DOT HS 812 068, which is incorporated by reference. This document explains how the relevant level of information is important for the driver.

Advantageously, the step: determining whether or not the identified potential risk is located in the field of view of the driver and is hidden in a blind spot area of the vehicle, is performed dynamically when the vehicle circulates or is moving. This increases the safety while driving, and not only when the vehicle is parked or stopped (e.g., at a traffic light).

The present disclosure also relates to a driver-assistance system having a processor arranged to implement the method for driver assistance according to the present disclosure. In other words, the present disclosure also relates to a data processing driver-assistance system comprising a processor configured to perform the steps of the method for driver assistance. This provides a driver-assistance system with an improved level of safety, while not disturbing the driver with not necessary volume of information and confirming him that the driving responsibility remains with him.

The present disclosure also relates to a vehicle integrating the driver-assistance system according to the present disclosure.

Advantageously, the vehicle further includes at least one external sensor, at least one internal sensor and a human machine interface. This provides a vehicle with an improved level of safety, while not disturbing the driver with not necessary volume of information and confirming him that the driving responsibility remains with him.

The present disclosure also relates to a computer program comprising instructions which, when the program is executed by a processor, cause the processor to control the execution of the steps of the method according to the present disclosure. In other words, the present disclosure also relates to a computer program comprising instructions which, when the program is executed by a computer, cause the computer to carry out the steps of the method according to the present disclosure. This provides a computer program increasing the with an improved level of safety, while not disturbing the driver with not necessary volume of information and confirming him that the driving responsibility remains with him.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
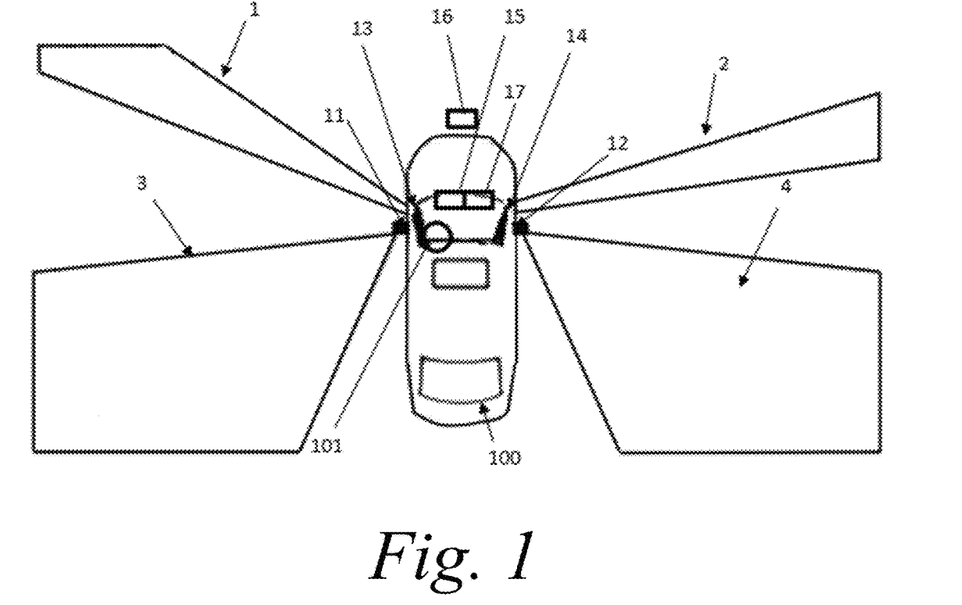
FIG. 1 shows a vehicle according to the present disclosure.

FIG. 1 shows a vehicle 100 having a driver-assistance system according to the present disclosure. The driver-assistance system has a processing unit arranged to implement a method for driving assistance according to the present disclosure. The vehicle 100 has also an advanced driver-assistance system (ADAS).

The vehicle 100 has a left pillar 13 and a right pillar 14. The vehicle 100 has also a left rear-view mirror 11 and a right rear-view mirror 12. When a driver 101 is present in the vehicle 100 in order to drive the vehicle 100, the vehicle presents some blind spot areas 1, 2, 3, 4, wherein the driver 101 cannot see correctly (or cannot see at all) the objects.

To be more specific: there is a left front blind spot area 1 due to the left front pillar 13, there is a right front blind spot area 2 due to the right front pillar 14, there is a left rear blind spot area 3 due to the fact that the left rear-view mirror 11 cannot show all the left rear side, and there is a right rear blind spot area 4 due to the fact that the right rear-view mirror 12 cannot show all the right rear side. There is thereby a need to inform or alert the driver of the presence of any dangerous object in the blind spot areas.

The vehicle 100 further includes a set of external sensors 16 (or a set of outside sensors 16), such as video cameras, radars, lidars arranged to perform an environmental analysis 200 around the vehicle 100. The driver-assistance system has memory means, such as RAM and ROM, along with identification means, such as a neural network, in order to identify a potential risk around the vehicle 100 based on the performed environment analysis. The driver-assistance system is able to detect and to recognize an obstacle around the vehicle 100.

The vehicle 100 further includes a set of internal sensors 15 (or a set of inside sensors 15), such as an internal camera (mono-focal or multi-focal) or an eye-tracking device, in order to identify a field of view 102 of the driver 101. This could also relate to the identification of a line of sight of the driver, the eye positions or a position or an orientation of the head of the driver 101, and the position of the driver 101 in its seat.

The line of sight of the driver may be checked by the direction of the face and the eye gaze. In particular, the field of view 102 of the driver may be tracked to define where the driver 101 looks. Some example of regions of interest or regions of distraction are: the radio equipment, the steering wheel, the internal rear-view mirror, the windscreens, the lateral windows, the left rear-view mirror 11, the right rear-view mirror 12, the passenger seats.

The vehicle 100 further includes a human machine interface 17, such as a display unit and a sound emitting device, in order to inform the driver 101.

Figure 2:
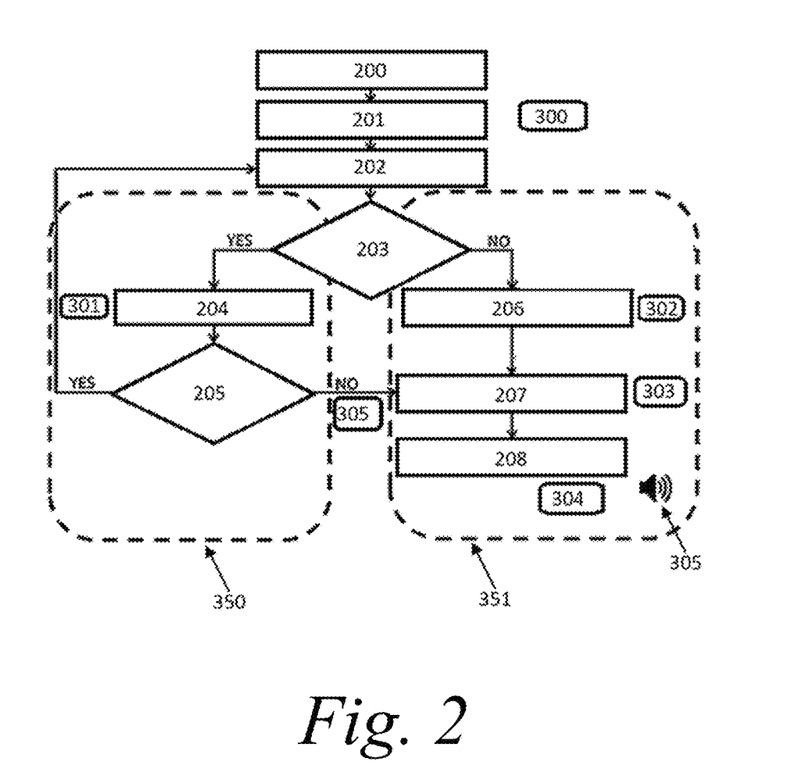
FIG. 2 shows steps of a method for driver assistance according to the present disclosure.

FIG. 2 shows steps of the method for driver assistance. The environmental analysis 200 is performed. Images, videos, or detections are performed with the set of external sensors 16. Images or videos are captured by the camera of the vehicle 100, while detection is performed by radars and/or lidars of the vehicle 100 and/or retrieved in the captured images or captured videos.

Identification of a potential risk 700 is performed and is labelled 201, preferably at 360 degrees around the vehicle 100. This permits for the detection of the potential risk 700, as illustrated with more details in the driving scenario of FIG. 4 below. If the potential risk is identified, a first warning or LEVEL 1 warning 300 (or low-level warning) is emitted by the human interface 17 of the vehicle 100. The LEVEL 1 warning 300 could be for example a green label in the display unit or a low-level sound at the speakers of the vehicle 100. Then, analysis and identification of the field of view 202 is performed by the internal set of sensors 15 along with the processing unit, and the result of the analysis and identification is further processed as explained below.

The step of determining whether or not (i.e., checking) the identified potential risk 700 is located in the field of view 102 of the driver 101 and is hidden in a blind spot area 1, 2, 3, 4 of the vehicle, labelled 203, is performed.

If the response to the above determination 203 is YES, an information is sent to the driver 101 to change the driver's position in order to be able to see the identified potential risk 700. This information may include a LEVEL 1A warning 301 (or medium-level warning) which is emitted, for example an orange continuous warning on the display unit.

If the response to the above determination 203 is NO, an information is sent to the driver 101 that a risk is present without immediate danger 206. This information may include a LEVEL 1B warning 302 (or low-level warning, which may also to set as a medium-level warning) which is emitted, for example an orange blinking warning on the display unit and a low-level sound or low-speed sound (e.g., one beep per second).

Then, the step of determining whether or not (i.e., checking) the driver 101 has changed the driver's position in order to be able to see the identified potential risk 700, labelled 205, is performed.

If the response to the above determination 205 is YES, the step labelled 202, of analyzing and identifying the field of view, is repeated. In other words, it means that the driver 101 correctly changed its position in the vehicle or in its seat or correctly changed its field of view, so as to correctly acknowledge the potential risk 700.

If the response to the above determination 205 is NO, the step of informing the driver 101 to immediately change the driver's position in order to be able to see the identified potential risk 700, is performed. This information may include a LEVEL 1C warning 305 (or medium-level warning) which is emitted, for example an orange blinking type warning on the display unit and a medium-level sound or medium-speed sound (e.g., two beeps per second).

Then, the step of determining whether or not (i.e., checking) a critical point of the identified potential risk 700 will be reached within predetermined period, labelled 207, is performed.

If the critical point of the identified potential risk 700 will be reached within the predetermined period, the step of informing the driver 101 of a forthcoming takeover of the driver-assistance system and then allowing the forthcoming takeover of the driver-assistance system, labelled 208, is performed. This information may include a LEVEL 2 warning 304 (or high-level warning) which is emitted, for example a red continuous warning on the display unit and a high-level sound or continuous sound 305.

The predetermined period can be set for example at 3 seconds or less. It is to be noted that the predetermined period can be set differently if the driver has changed its position at the above-mentioned step 205. Indeed, in this case, the predetermined period is set as a double check period, which is preferably lower than the predetermined period of the labelled step 206, wherein the risk was without immediate danger. The goal is to encourage the driver to be responsible for his driving. The double check period can be set at 2 seconds or less.

Further, this permits two modes to be distinguished between: the first mode 350, wherein the driver 101 is looking in direction of the potential risk 700, so that the attention assistance is performed, and the second mode 351, in contrast, wherein the driver-assistance feature will take over the control of the vehicle.

If the risk without immediate danger defined at the step labelled 206 is still present after a short period of time (e.g., few seconds), an information is sent to the driver 101. This information may include a LEVEL 1D warning 303 (or medium-level warning) which is emitted, for example an orange blinking type warning on the display unit and a medium-level sound or medium-speed sound (e.g., two beeps per second). It is to be noted that LEVEL 1A, 1B, 1C and 1D are all a WARNING LEVEL 1.

In all cases, if the critical point of the identified potential risk 700 will be reached within a general safety period (e.g., 0.5 seconds), the step of informing the driver 101 of a forthcoming takeover of the driver-assistance system and then allow the forthcoming takeover of the driver-assistance system, labelled 208, is performed. The time to collision may be different between the two modes 350, 351, but the general safety period is set to be safe. That is to say, the initial predetermined period can be set with a higher value than the double check period, and the double check period can be set with an higher value than the general safety period. Further, this set of values can be changed according to the driving mode (safe, comfort, sport, baby on board, city driving wherein the speed is limited to 50 or 60 km/h, motorway driving wherein the speed is usually between 80 and 140 km/h, rural driving wherein the speed is between 60 and 80 km/h, etc.).

In other words, a time to collision is monitored and the steps are looped continuously. If the time to collision (for any reason, like target/vehicle direction or speed change) is increasing until above a specific time to collision limit (above which there is no risk of collision) while the steps are looped, there is no need to allow the forthcoming takeover of the driver-assistance system. The time to collision is adjusted in consequence and continuously when the vehicle circulates (for any reason, like target/vehicle direction or speed change). In other words, it means that if the driver 101 correctly changed its position in the vehicle or in its seat or correctly changed its field of view, so as to correctly acknowledge the potential risk 700 and took action to avoid it, or if there is no risk anymore due to time to collision above the specific time to collision (target change), there is no need any more to alert him of the forthcoming takeover of the driver-assistance system and then allowing the forthcoming takeover of the driver-assistance system, as the risk has been safely identified and avoided.

Figure 3:
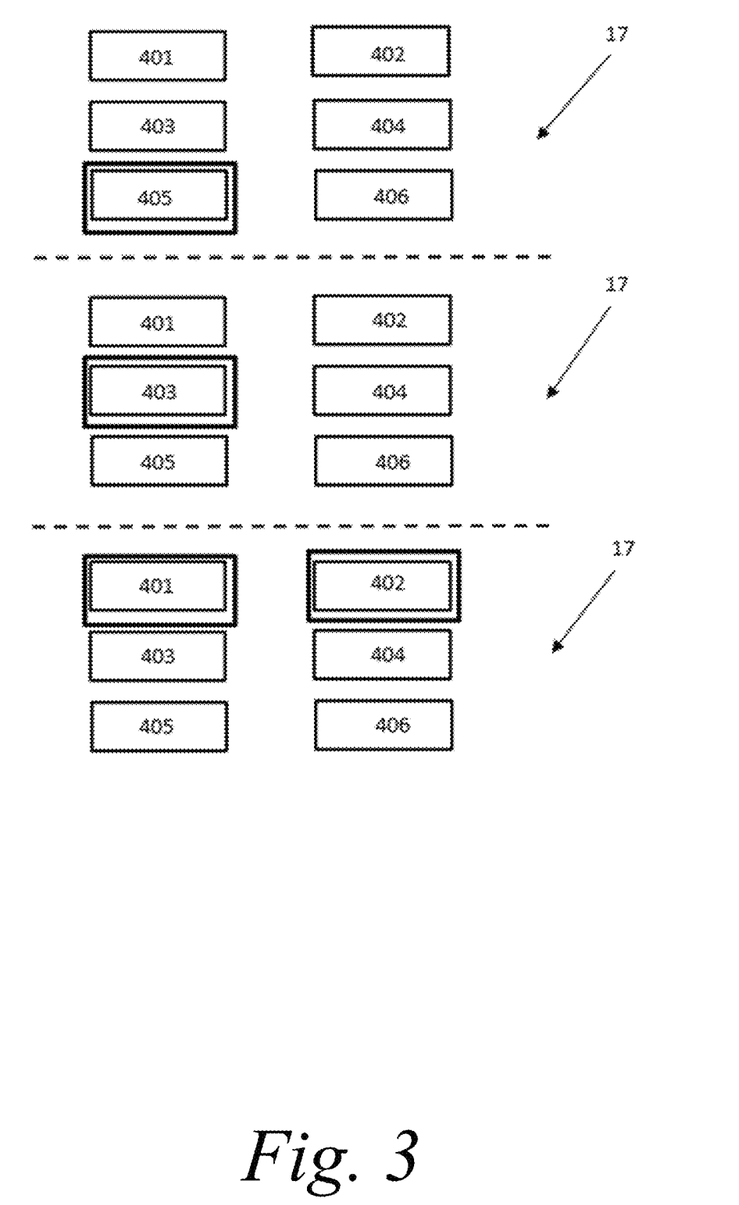
FIG. 3 shows a display unit of the vehicle in different situations.

FIG. 3 shows the display unit of the vehicle in different situations, which is an example of the human machine interface 17. As discussed above, the principle of the present disclosure is to assist the driver by warning him in case of risky situation and checking his field of view to inform and alert him if the danger is in a blind spot area. This will catch his attention and make him anticipate the upcoming driver-assistance system feature or action (e.g., braking, steering).

This assistance should check when a risk is estimated to be critical rather soon (e.g., Time To Collision calculated) and trigger a warning as soon as a defined threshold is reached. For example a situation where the time to collision is below three second, the system may trigger a first WARNING LEVEL 1 (ex: visual) and hold it until the critical point is reached (that is to say when the driver-assistance will take action on the vehicle motion), WARNING LEVEL 2 (ex: visual+sound). Before this critical point is reached, it can be considered that the collision can be avoided by a driver manipulation. Thus, he should be aware of the danger approaching. In a case where the driver has not seen the danger because of blind spot area inside the car, a specific warning DANGER IN BLIND SPOT (ex: haptic+sound in the pillar, different from LEVEL 1 and 2 HMI and catching driver attention in direction of the risk) may be triggered. This should catch the driver attention and have his mind in the loop of the vehicle driving. This will help him anticipate the risk and the associated WARNING LEVEL 2 while the driver-assistance system feature will take action.

For this, calculation may be performed to measure the position of the driver's eyes and determine whether his field of view (or line of sight) is masked by one of the pillar for instance by measuring the eye gaze. This will allow to determine the blind zone dynamically.

For the warning logic to catch driver attention, reference is made to the document DOT HS 812 068 from National Highway Traffic Safety Administration "Human Factors for Connected Vehicles: Effective Warning Interface Research Findings." which is incorporated by reference.

This document summarizes studies that shows effectiveness of warning drivers of hazardous situations. Some factors out of those studies will be used in this invention to have effective alert scheme, namely visual (color and fix/blinking) and sound (sequential/continuous). Those factors combined in the alert scheme allow effective alert for the different stage of the invention. Effectiveness is defined by a combination of importance, urgency, annoyance, and acceptability that the participants of study rated in different situation experienced.

The driver-assistance system reaction is defined by the steps described in the present disclosure.

A potential risk can be characterized by a target (that is to say a road user identified by the conventional driver-assistance system) that presents a risk of collision with the vehicle. The driver-assistance system permits characterization of the risk and predicts his trajectory.

Using all those data, an algorithm evaluates if the driver is looking in the direction of the risk and if the risk is hidden by a blind spot area. This can be a look direct into the risk or through the external mirrors when the risk is in the rear field of view.

The FIG. 3 illustrates a display on dashboard for alert signals. Alert signals will be oriented depending on side of the danger, except for the WARNING 2 level where the sound will be emitted on both sides.

The display unit is organized with different zones, 401-406, with a left display zone 401, 403, 405 and a right display zone 402, 404, 406. When a low-level danger is detected, the display zones 405 and 406 are highlighted in green and may be highlighted according to the side (left or right) of the risk (left side on the upper schematic representation of the display unit of FIG. 3). The green highlight may be continuous. When a medium-level danger is detected, the display zones 403 and 404 are highlighted in orange and may be highlighted according to the side (left or right) of the risk (left side of the middle schematic representation of the display unit of FIG. 3). The orange highlight may be blinking and accompanied by a medium-level sound (or medium frequency sound alert). When a high-level danger is detected, the display zones 401 and 402 are highlighted in red (the lower schematic representation of the display unit of FIG. 3). The red highlight may be continuous and accompanied with an important sound alert.

It is to be noted that the step of informing the driver 101 to change the driver's position in order to be able to see the identified potential risk can be adapted according to the driving mode mentioned above. In particular, the sound level can be set higher when the driving mode is set on motor way driving compared to the sound level when the driving mode is city driving. Also the set of colors can be adapted, with a higher level of color alert depending on the speed. Also the text message can be adapted according to the speed of the vehicle.

Figure 4:
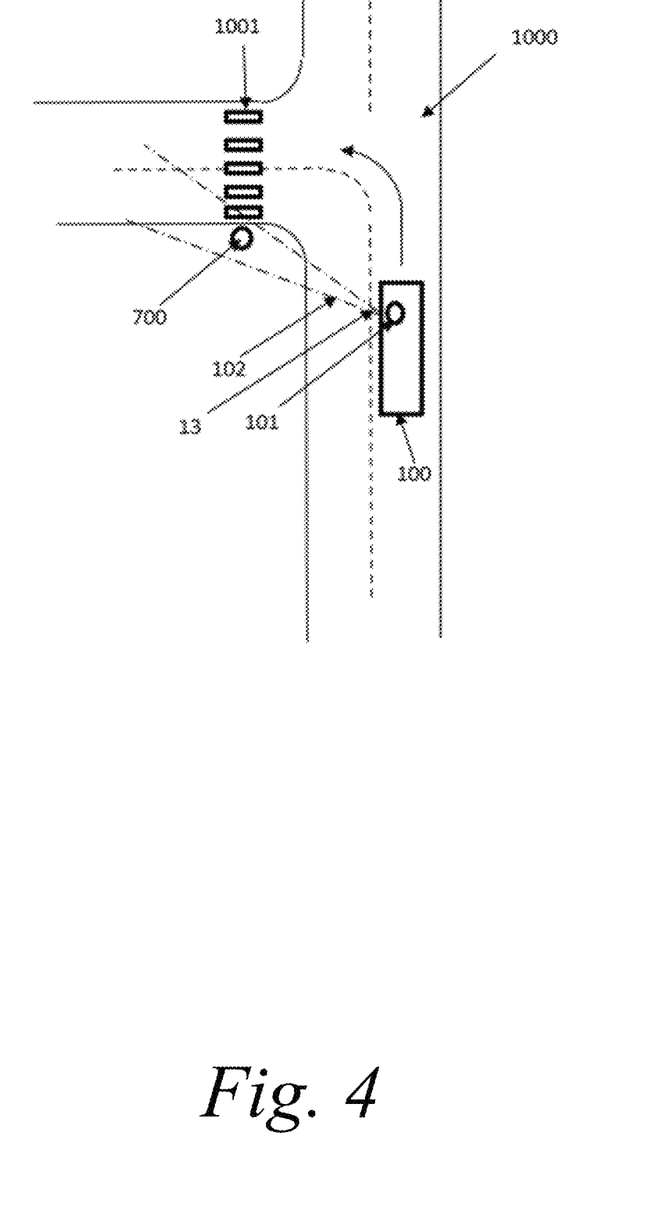
FIG. 4 shows a driving scenario.

FIG. 4 shows a driving scenario. The driver 101 is present in the vehicle 100 and drives the vehicle 100 in a street 1000. The driver 101 would like to turn left and has its field of view 102 in that direction. The field of view 102 is hidden by the left front pillar 13 of the vehicle 100. In the meantime, a pedestrian 700 would like to cross the street 1000 on the pedestrian walkway 1001. But the pedestrian 700 is hidden in the left front blind spot area 1.

The driver is informed that there is the potential risk which is identified and that he must change its position (or head position or look direction) in order to see the potential risk, by a text message (such as "change position to see danger in blind spot" or "blind spot danger"), the above mentioned color indication and sound indication or any combination thereof. If he does not change its position, the driver-assistance system will take over the control and will brake. Further, the driver-assistance may emit an external warning with the horn (or klaxon) of the vehicle 100 in order to alert the pedestrian 700.

In other words, the driver line of sight is masked by the front left pillar (blind spot area), thus the system may trigger a WARNING LEVEL 1. After a WARNING LEVEL 1, the system monitors driver attention to the risk. If the risk is in the blind spot line of sight of the driver, the specific warning (WARNING DANGER IN BLIND SPOT) is triggered to catch driver attention. If no action from the driver is performed to have the risk in his direct line of sight or even avoiding it, then a WARNING LEVEL 2 is triggered and the driver-assistance system feature can take control and brake to avoid collision with the pedestrian but at least the driver is aware of a danger in the blind spot and upcoming driver-assistance system action on vehicle motion.

It is of course understood that obvious improvements and/or modifications for one skilled in the art may be implemented, still being under the scope of the invention as it is defined by the appended claims.

In particular, reference is made to the use of another warning signal outside the vehicle 100.

What is claimed is:

1. A method comprising:
   implementing, by a driver-assistance system of a vehicle, a driver-assistance procedure that includes:
   performing an environment analysis around the vehicle;
   identifying a potential risk around the vehicle and in a forward direction for a driver of the vehicle based on the performed environment analysis;
   identifying a field of view of the driver in the forward direction;
   identifying a dynamic blind spot area caused by a front pillar of the vehicle based on the field of view of the driver;
   determining if the identified potential risk is hidden in the dynamic blind spot area of the vehicle;
   responsive to determining that the identified potential risk is hidden in the dynamic blind spot area of the vehicle, informing the driver about the identified potential risk and directing the driver to change the driver's position;
   responsive to informing the driver about the identified potential risk and directing the driver to change the driver's position, determining whether the driver has changed the driver's position, determining an updated field of view of the driver in the forward direction after the driver has changed the driver's position, updating the dynamic blind spot area based on the updated field of view of the driver, and determining whether the identified potential risk is hidden in the updated dynamic blind spot area;
   responsive to determining that the driver has changed the driver's position and that the identified potential risk is not hidden in the updated dynamic blind spot area, implementing the driver-assistance procedure again; and
   responsive to determining that the driver has not changed the driver's position or that the identified position risk is hidden in the updated dynamic blind sport area, issuing a warning to the driver with a human machine interface of the vehicle about the identified potential risk.

2. The method according to claim 1, wherein issuing the warning to the driver about the identified potential risk comprises at least one of:
   displaying an orange blinking warning in the human machine interface of the vehicle; or
   emitting a repeated sound in the human machine interface of the vehicle.

3. The method according to claim 1, further comprising:
   determining whether a critical point of the identified potential risk will be reached within a double check period, and
   responsive to determining that the critical point of the identified potential risk will be reached within the double check period:
   informing the driver of a forthcoming takeover of the driver-assistance system; and
   allowing the forthcoming takeover of the driver-assistance system.

4. The method according to claim 3, wherein informing the driver of the forthcoming takeover of the driver-assistance system comprises at least one of:
   displaying a red continuous warning in the human machine interface of the vehicle; or
   emitting a continuous alert sound in the human machine interface of the vehicle.

5. The method according to claim 1, further comprising:
   determining whether a critical point of the identified potential risk will be reached within a general safety period, and
   responsive to determining that the critical point of the identified potential risk will be reached within the general safety period:
   informing the driver of a forthcoming takeover of the driver-assistance system; and
   allowing the forthcoming takeover of the driver-assistance system.

6. The method according to claim 5, wherein informing the driver of the forthcoming takeover of the driver-assistance system comprises at least one of:
   displaying a red continuous warning in the human machine interface of the vehicle; or
   emitting a continuous alert sound in the human machine interface of the vehicle.

7. The method according to claim 1, further comprising:
   responsive to determining that the identified potential risk is not hidden in the updated blind spot area of the vehicle, informing the driver that the identified potential risk is without immediate danger.

8. The method according to claim 1, wherein issuing the warning to the driver about the identified potential risk comprises:
   displaying an orange continuous warning in the human machine interface of the vehicle.

9. The method of according to claim 1, wherein determining if the identified potential risk is hidden in the dynamic blind spot area of the vehicle is performed while the vehicle is moving.

10. A system comprising:
    a processor configured to implement a driver-assistance procedure operating as a driver-assistance system, the driver-assistance procedure comprising operations to:
    perform an environment analysis around a vehicle;
    identify a potential risk around the vehicle and in a forward direction for a driver of the vehicle based on the performed environment analysis;
    identify a field of view of the driver in the forward direction;
    identify a dynamic blind spot area caused by a front pillar of the vehicle based on the field of view of the driver;
    determine if the identified potential risk is hidden in the dynamic blind spot area of the vehicle;
    responsive to a determination that the identified potential risk is hidden in the dynamic blind spot area of the vehicle, inform the driver about the identified potential risk and direct the driver to change the driver's position;
    responsive to informing the driver about the identified potential risk and directing the driver to change the driver's position, determine whether the driver has changed the driver's position, determine an updated field of view of the driver in the forward direction after the driver has changed the driver's position, update the dynamic blind spot area based on the updated field of view of the driver, and determine whether the identified potential risk is hidden in the updated dynamic blind spot area;
    responsive to determining that the driver has changed the driver's position and that the identified potential risk is not hidden in the updated dynamic blind spot area, implement the driver-assistance procedure again; and responsive to determining that the driver has not changed the driver's position or that the identified position risk is hidden in the updated dynamic blind sport area, issue a warning to the driver with a human machine interface of the vehicle about the identified potential risk.

11. The system according to claim 10, wherein the operation to issue the warning to the driver about the identified potential risk further comprises further operations to at least one of:
   display an orange blinking warning in the human machine interface of the vehicle; or
   emit a repeated sound in the human machine interface of the vehicle.

12. The system according to claim 10, wherein the driver-assistance procedure further comprises the operations of:
   determine whether a critical point of the identified potential risk will be reached within a double check period, and
   responsive to a determination that the critical point of the identified potential risk will be reached within the double check period:
      inform the driver of a forthcoming takeover of the driver-assistance system; and
      allow the forthcoming takeover of the driver-assistance system.

13. The system according to claim 12, wherein the operation of inform the driver of the forthcoming takeover of the driver-assistance system comprises at least one of:
   display a red continuous warning in the human machine interface of the vehicle; or
   emit a continuous alert sound in the human machine interface of the vehicle.

14. The system according to claim 10, wherein the driver-assistance procedure further comprises the operations:
   determine whether a critical point of the identified potential risk will be reached within a general safety period, and
   responsive to at determination that the critical point of the identified potential risk will be reached within the general safety period:
   inform the driver of a forthcoming takeover of the driver-assistance system; and
   allow the forthcoming takeover of the driver-assistance system.

15. The system according to claim 14, wherein the operation of inform the driver of the forthcoming takeover of the driver-assistance system further comprises at least one of:
   display a red continuous warning in the human machine interface of the vehicle; or
   emit a continuous alert sound in the human machine interface of the vehicle.

16. The system according to claim 10, wherein responsive to a determination that the identified potential risk is not hidden in the updated dynamic blind spot area of the vehicle, the processor is further configured to execute an operation comprising:
   inform the driver that the identified potential risk is without immediate danger.

17. The system according to claim 10, wherein the operation of inform the driver about the identified potential risk further comprises:
   display an orange continuous warning in the human machine interface of the vehicle.

18. The system according to claim 10, wherein the operation to determine if the identified potential risk is hidden in the dynamic blind spot area of the vehicle is performed while the vehicle is moving.

* * * * *